(12) United States Patent
Huang

(10) Patent No.: US 9,630,458 B2
(45) Date of Patent: Apr. 25, 2017

(54) METHOD FOR MONITORING TIRE SAFETY

(71) Applicant: SUNG JUNG MINUTE INDUSTRY CO., LTD., Hsinchu County (TW)

(72) Inventor: Wen-Huo Huang, Hsinchu County (TW)

(73) Assignee: SUNG JUNG MINUTE INDUSTRY CO., LTD., Hsinchu County (TW)

( * ) Notice: Subject to any disclaimer, the term of this patent is extended or adjusted under 35 U.S.C. 154(b) by 218 days.

(21) Appl. No.: 14/585,753

(22) Filed: Dec. 30, 2014

(65) Prior Publication Data

US 2016/0185166 A1   Jun. 30, 2016

(51) Int. Cl.
*B60C 23/04* (2006.01)

(52) U.S. Cl.
CPC ............................... *B60C 23/0476* (2013.01)

(58) Field of Classification Search
CPC ....................................................... B60C 23/20
See application file for complete search history.

(56) References Cited

U.S. PATENT DOCUMENTS

2006/0132296 A1* 6/2006 Robson ............... B60C 23/0408
340/445

2007/0295073 A1* 12/2007 Bougeard ........... B60C 23/0408
73/146

FOREIGN PATENT DOCUMENTS

TW         M476710 U     4/2014

* cited by examiner

*Primary Examiner* — Paul West
*Assistant Examiner* — Mark A Shabman
(74) *Attorney, Agent, or Firm* — Muncy, Geissler, Olds & Lowe, P.C.

(57) ABSTRACT

A method for monitoring tire safety is adopted for use on a vehicle equipped with a plurality of tires, a plurality of tire detection units located respectively on each tire to detect the interior conditions thereof, and an electronic device which forms information link with each tire detection unit. The method includes: each tire detection unit measures a corresponding tire measurement parameter; next, the tire measurement parameter is set in a tire status variation calculation formula and a contour variation calculation formula to calculate a plurality of parameters that represent each tire; next, calculate variation amounts of the parameters in an inspection time and convert to a status gradient data; then judge whether the status gradient data are coincided. Redo execution of the previous steps if the judged outcome is positive; otherwise generate an alarm signal about an abnormal condition through an electronic device to alert the vehicle driver.

11 Claims, 9 Drawing Sheets

METHOD FOR MONITORING TIRE SAFETY

FIELD OF THE INVENTION

The present invention relates to a monitoring method and particularly to a method for monitoring tire safety adopted for use on vehicles to monitor safety of tires.

BACKGROUND OF THE INVENTION

Statistics show that abnormality of vehicle tires always is the most unpreventable problem for drivers.

Taiwan Patent No. M476710 discloses a vehicle tire pressure alarm device which includes a vehicle equipped with a plurality of tires, a plurality of sensors located respectively on each tire to detect the interior pressure thereof, a plurality of emitters corresponding respectively to each sensor to emit a pressure signal detected by each sensor, and a control panel. The control panel has a central processor to receive the pressure signal emitted from each emitter and a plurality of indication lamps electrically connected to the central processor. In the event that the pressure of each tire is higher or lower than a preset value the central processor issues an abnormal signal to light the corresponding indication lamp to alert driver to maintain adequate or reduce the corresponding tire pressure. However, the conventional alarm device alerts the driver only after the pressure has exceeded a threshold, and does not provide timely feedback to the driver during change of the pressure. As a result, the driver cannot make preventive action for remedy before the pressure exceeds the threshold.

SUMMARY OF THE INVENTION

The primary object of the present invention is to solve the problem of the conventional alarm device of unable to provide effective detection and feedback of instant tire variation conditions and alert the driver possible situations that might happen to the tires.

To achieve the foregoing object the present invention provides a method for monitoring tire safety adopted for use on a vehicle. The vehicle is equipped with a plurality of tires, a plurality of tire detection units located respectively on each tire to detect the interior pressure thereof in regular conditions, and an electronic device which forms information link with each tire detection unit. Each tire has a tire design parameter to represent the tire composition and a gas filling parameter to indicate a gas filled in the tire. The method includes the steps as follows: step 1: each tire detection unit measures a tire measurement parameter of the corresponding tire; step 2: perform calculation of the gas filling parameter and the tire measurement parameter of each tire through a tire status variation calculation formula to generate a tire calculation parameter to represent variation of the tire; step 3: calculate variation amount of the tire calculation parameter in an inspection time and convert to a status gradient data; step 4: judge whether the status gradient data is consistent or the variation amount is proximate, if positive, redo execution of step 1, otherwise enter the next step; and step 5: generate an alarm signal through the electronic device and alert the driver at least one of the tires being abnormal.

In an embodiment the tire design parameter includes a linear thermal expansion coefficient and the circumferential length of the tire after inflation. The gas filling parameter includes the mole number of gas molecules and a gas constant.

In another embodiment the tire measurement parameter includes a temperature measurement parameter and a pressure measurement parameter. The tire calculation parameter includes a volume parameter to represent the tire volume of the tire at one time. The status gradient data includes a volume gradient data converted from a plurality of volume parameters in the inspection time.

In yet another embodiment the tire status variation calculation formula is:

$$p \cdot V = n \cdot R \cdot T$$

where p is the tire pressure of each tire, V is the volume of each tire, n is the number of moles of gas molecules of each tire, R is a gas constant of each tire, and T is a tire temperature of each tire.

In yet another embodiment the step 2 further includes performing calculation of the tire design parameter and the tire measurement parameter of each tire through a contour variation calculation formula to generate a tire volume parameter to represent change of the tire. The contour variation calculation formula is as follow:

$$(L_T - L_0) = \alpha \cdot L_0 \cdot \Delta T$$

where $L_T$ is a final circumferential length of each tire changed with tire temperature, $L_0$ is an initial circumferential length of each tire, $\alpha$ is a linear thermal expansion coefficient of each tire, and $\Delta T$ is variation amount of the temperature measurement parameter of each tire.

In yet another embodiment the step 2 further includes performing calculation of the gas filling parameter, the tire volume parameter and a temperature measurement parameter of each tire through the tire status variation calculation formula to generate the tire calculation parameter to represent the pressure parameter of the tire pressure at one time. The status gradient data includes a pressure gradient data generated via conversion of the multiple pressure parameters in the inspection time.

In yet another embodiment the step 2 further includes performing calculation of the gas filling parameter, the tire volume parameter and a pressure measurement parameter of each tire through the tire status variation calculation formula to generate the tire calculation parameter to represent the temperature parameter of the tire temperature at one time. The status gradient data includes a temperature gradient data generated via conversion of the multiple temperature parameters in the inspection time.

In yet another embodiment the step 4 further includes comparing whether change proportions of the pressure gradient data and the temperature gradient data in the inspection time are proximate; if positive, redo execution of the step 1; otherwise, enter the next step.

In yet another embodiment the step 2 further includes performing calculation of the tire volume parameter and a temperature measurement parameter and a pressure measurement parameter of each tire through the tire status variation calculation formula to generate the tire calculation parameter to represent the gas parameter of the tire that changes at one time. The status gradient data includes a gas gradient data generated via conversion of the multiple gas parameters in the inspection time.

In yet another embodiment the step 4 further includes judging whether the status gradient data of each tire coincided with or proximate in variation with other tires; if positive redo execution of the step 1; otherwise, enter the next step.

In yet another embodiment the step 4 further includes judging whether the status gradient data in the inspection time coincided with the tire status variation calculation formula; if positive enter the step 4; otherwise, enter the step 5.

The method for monitoring tire safety of the invention, compared with the conventional alarm devices, provides many advantages, notably:

1. The aforesaid gradient data of each tire can be compared with the gradient data of other tires, hence can instantly judge which tire is abnormal.

2. Through variation curves of the volume gradient data, the pressure gradient data, the temperature gradient data and the gas gradient data changes of the tires can be clearly known, and by comparing whether the variation proportions of the pressure gradient data and the temperature gradient data similar to each other, whether each tire is safe can be known.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
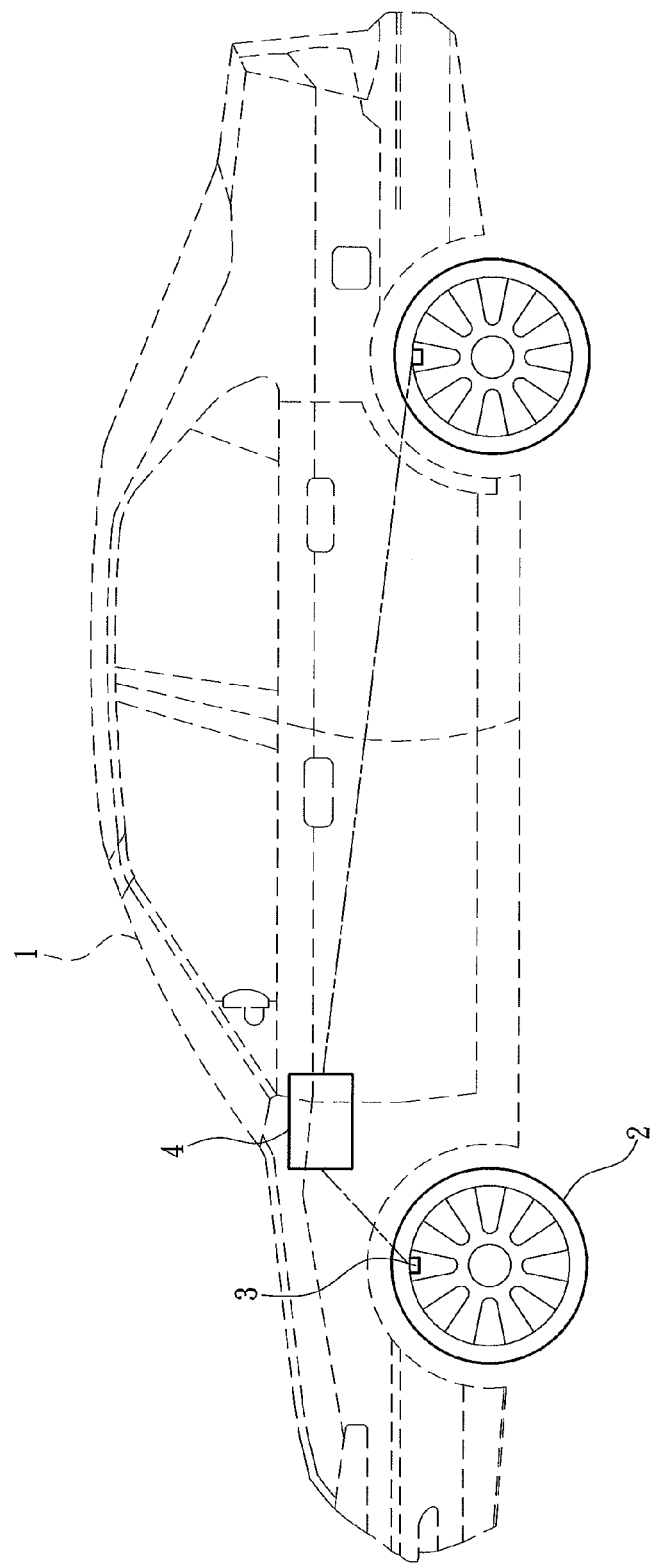
FIG. 1 is a schematic view of the invention implemented on a vehicle.

Please referring to FIG. 1, the present invention aims to provide a method for monitoring tire safety that is adopted for use on a vehicle 1 to provide feedback of various conditions of the tire in driving, consequentially to prevent problems of tire in advance. More specifically, the vehicle 1 generally is equipped with a plurality of tires 2 each has a tire detection unit 3 located thereon to detect regularly the interior condition of the corresponding tire 2, then through an electronic device 4 which forms information link with the tire detection unit 3 to send feedback of the various conditions of the tire 2 to the driver.

Figure 2:
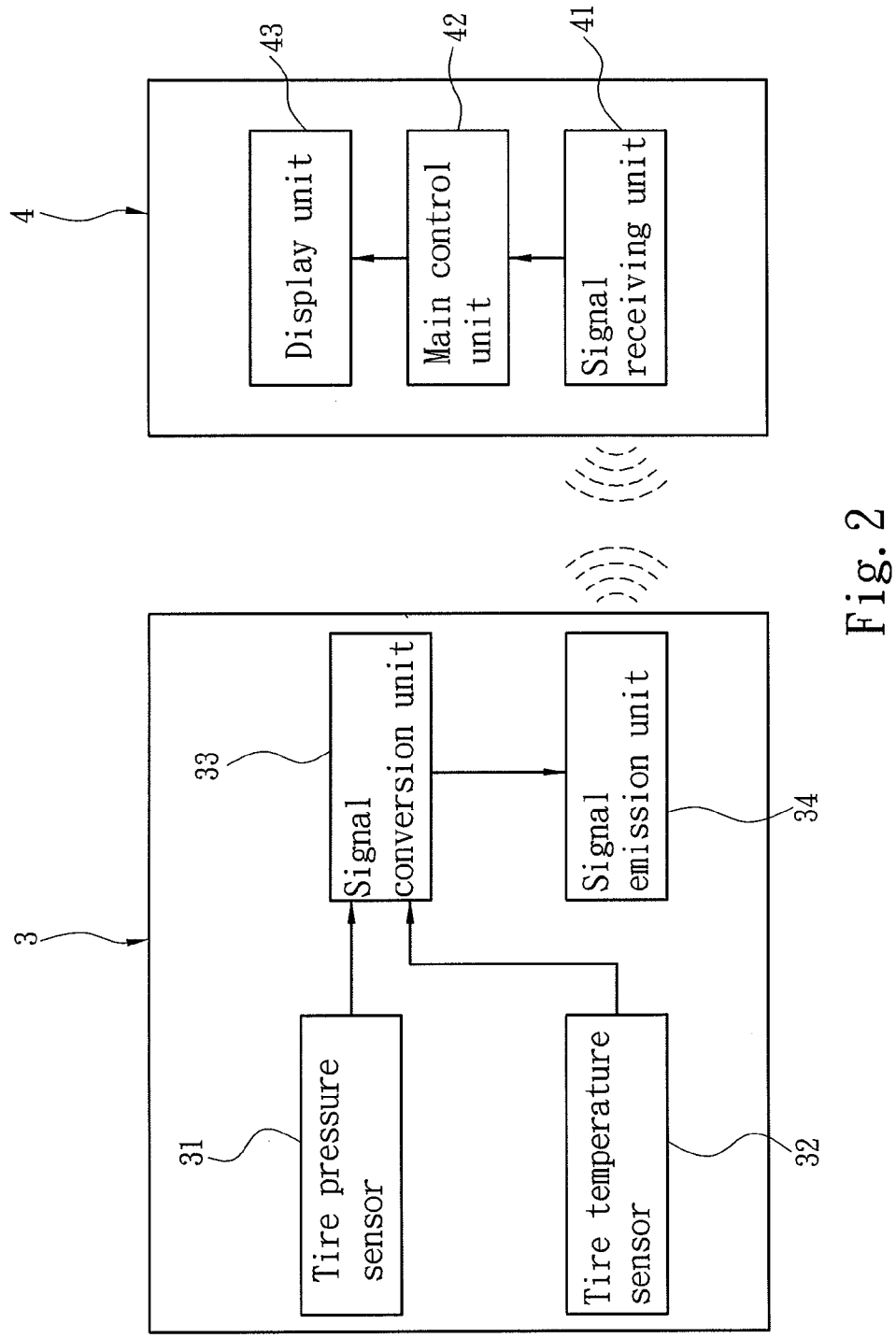
FIG. 2 is a schematic block diagram of the tire detection unit and the electronic device of the invention in an implementing condition.

Please also referring to FIGS. 1 and 2, each tire detection unit 3 includes a tire pressure sensor 31 to detect tire pressure of the tire 2, a tire temperature sensor 32 to detect tire temperature of the tire 2, a signal conversion unit 33 electrically connected to the tire pressure sensor 31 and the tire temperature sensor 32 to convert data detected by the tire pressure sensor 31 and the tire temperature sensor 32 to a signal, and a signal emission unit 34 electrically connected to the signal conversion unit 33 to transmit the signal in a wireless fashion to the electronic device 4. But the composition of the tire detection unit 3 is not limited to the embodiment set forth above. Furthermore, each tire detection unit 3 further has an identification code. The signal, not only includes multiple monitoring information such as the tire pressure and the tire temperature and the like, also includes the identification code. The electronic device 4 includes a signal receiving unit 41 to receive the signal, a main control unit 42 electrically connected to the signal receiving unit 41 to get the monitoring information and the identification code from the signal receiving unit 41, and a display device 43 electrically connected to the main control unit 42 to display instant information of each tire 2. The main control unit 42 has a plurality of device identification codes and processes the signal to get the monitoring information and the identification code, and judges whether the identification code matches the corresponding device identification codes. If matched, the main control unit 42 processes the received monitoring information to become a display data displayed on the display unit 43 to be viewed by the driver. Moreover, the main control unit 42 further judges through the identification code which tire detection unit 3 issues the signal, and displays those monitoring information on a plurality of display zones on the display unit 43. In other words, the display zones are graphically formatted according to the arrangement of each tire 2 to allow the driver to clearly see which tire 2 has problems.

Furthermore, each tire detection unit 3 can be located inside or outside of each tire 2. In addition, the wireless transmission of data between each tire detection unit 3 and the electronic device 4 can be chosen a Bluetooth communication protocol. However, in other embodiments data transmission between the tire detection unit 3 and the electronic device 4 also can be accomplished via line transmission.

More details of the invention are elaborated below: First, each tire 2 includes tire design parameters to represent composition of the tire. The tire design parameters include a linear thermal expansion coefficient and a circumferential length of the tire 2 after inflation. For instance, the tire 2 usually is made from rubber, hence the thermal expansion coefficient is selected from the rubber. Moreover, the invention monitors the safety of the tire 2 mainly through calculation two process formulas that are a contour variation calculation formula and a tire status variation calculation formula. The contour variation calculation formula is as follow:

$$(L_T - L_0) = \alpha \cdot L_0 \cdot \Delta T \tag{1}$$

In this embodiment the contour variation calculation formula is derived from a linear thermal expansion coefficient; where $L_T$ is a final circumferential length of each tire 2 changed with tire temperature, $L_0$ is an initial circumferential length of each tire 2, $\alpha$ is a linear thermal expansion coefficient of each tire 2, and $\Delta T$ is variation amount of tire temperature. Furthermore, the final circumferential length and the initial circumferential length of the tire do not merely indicate two values at the final and the initial states of each tire 2. Due to the tire temperature of the tire 2 changes with time in an inspection time, the final circumferential length and the initial circumferential length of the tire indicate respectively the circumferential length of the tire at a time spot and at a previous time spot. Moreover, each tire 2 also includes a gas filling parameter of a gas filled in the tire 2. The gas filling parameters includes the number of moles of gas molecules and a gas constant.

The tire status variation calculation formula is as follow:

$$p \cdot V = n \cdot R \cdot T \tag{2}$$

In the embodiment the tire status variation calculation formula is derived from an ideal gas status equation; where p is a tire pressure of each tire 2, V is the volume of each tire 2, n is the number of moles of gas molecules of each tire 2, R is the gas constant of each tire 2, and T is the tire temperature of each tire 2. Furthermore, V is the volume of each tire 2 and also is the volume of the gas at the same time.

Figure 3:
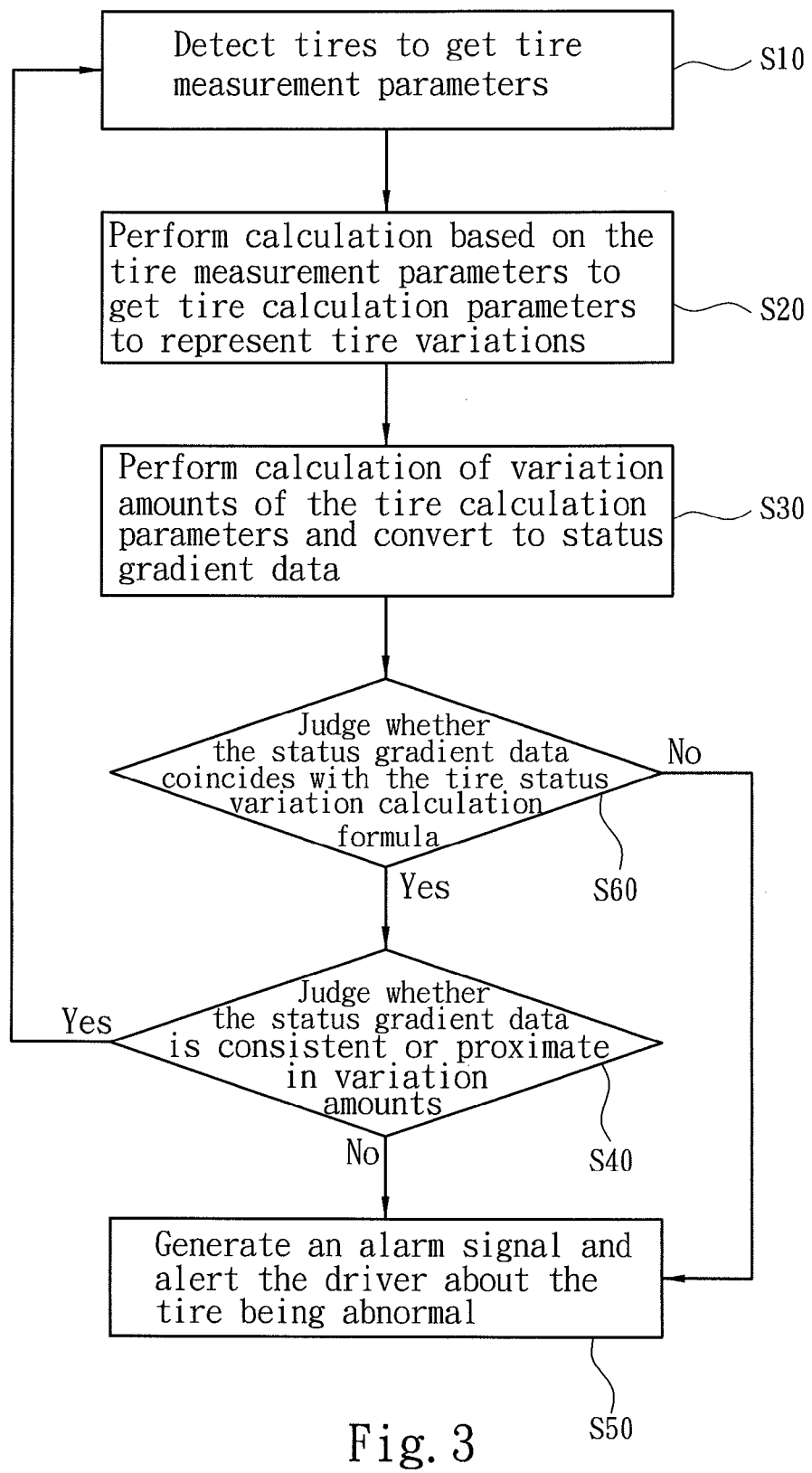
FIG. 3 is a process flowchart of a first embodiment of the invention.

Please refer to FIG. 3 for the process procedure of a first embodiment of the invention. The procedure includes the steps as follows: step 1—S10: measure tire measurement parameters of a corresponding tire 2 through each tire detection unit 3; step 2—S20: perform calculation of the gas filling parameter and the tire measurement parameters of each tire 2 through a tire status variation calculation formula to generate a tire calculation parameter to represent variation of the tire 2; step 3—S30: calculate variation amount of the tire calculation parameter in an inspection time and convert to a status gradient data; step 4—S40: judge whether the gradient data is consistent or the variation amount is proximate; is positive, redo execution of step 1; otherwise, enter the next step; step 5—S50: generate an alarm signal through the electronic device 4 and alert the driver of the vehicle 1 at least one tire 2 is abnormal; wherein the tire temperature sensor 32 measures the temperature of the tire 2 to get a temperature measurement parameter, and the tire pressure sensor 31 measures the tire pressure of the tire 2 to get a pressure measurement parameter.

Furthermore, step 2 further includes four calculation steps that include: step S21, step S22, step S23 and step S24. More specifically, step S1 performs calculation of the gas filling parameter and the tire measurement parameters of each tire 2 through the tire status variation calculation formula to generate a tire volume parameter at one time to represent the tire 2. The tire status variation calculation formula can be derived as follow:

$$V = \frac{n \cdot R \cdot T}{p} \quad (2\text{-}1)$$

More specifically, at step S21 the tire measurement parameters include the temperature measurement parameter and the pressure measurement parameter.

Similarly, the steps S23, S24 and S25 include calculation of the tire design parameter and the tire measurement parameters through the contour variation calculation formula to generate the tire volume parameter that represents variations of each tire 2. First, set the initial tire circumferential length, the linear thermal expansion coefficient and the tire temperature variation amount in the contour variation calculation formula, with the tire temperature variation amount being the variation amount of the temperature measurement parameter; then the final tire circumferential length increased or decreased due to rise or fall of the temperature measurement parameter of each tire 2 can be obtained through the contour variation calculation formula. Next, through the final tire circumferential length the diameter of the tire 2 can be derived inversely; finally, the tire volume parameter of the tire 2 can be obtained via calculation of the tire diameter. Because the contour of each tire 2 is equivalent to a cylindrical pillar, the tire volume parameter can be easily calculated and got through a cylindrical pillar volume calculation formula, details are omitted herein. In other words, the contour variation calculation formula preferably includes the cylindrical pillar volume calculation formula. Moreover, step S22 further can perform calculation of the gas filling parameter, the tire volume parameter and the tire measurement parameters of each tire 2 through the tire status variation calculation formula to generate a pressure parameter to represent the tire 2 at one time. The tire status variation calculation formula can be derived as follow:

$$p = \frac{n \cdot R \cdot T}{V} \quad (2\text{-}2)$$

More specifically, the tire measurement parameters include the temperature measurement parameter and the pressure measurement parameter.

Similarly, at step 23 the tire status variation calculation formula is used to calculate the gas filling parameter, the tire volume parameter and the tire measurement parameters of each tire 2 to generate the temperature parameter of the tire temperature of the tire 2 at one time. The tire status variation calculation formula can be derived as follow:

$$T = \frac{p \cdot V}{n \cdot R} \quad (2\text{-}3)$$

More specifically, the tire measurement parameters include the pressure measurement parameter.

Similarly, at step S24 the tire status variation calculation formula is used to calculate the tire volume parameter and the tire measurement parameters of each tire 2 to generate a gas parameter to represent variation of the tire 2 at one time. The tire status variation calculation formula can be derived as follow:

$$nR = \frac{p \cdot V}{T} \quad (2\text{-}4)$$

More specifically, the tire measurement parameters include the temperature measurement parameter and the pressure measurement parameter.

Thus, the invention can set the volume factor of each tire 2 in the monitoring process to predict more accurately the actual condition of the tire 2.

Figure 9:
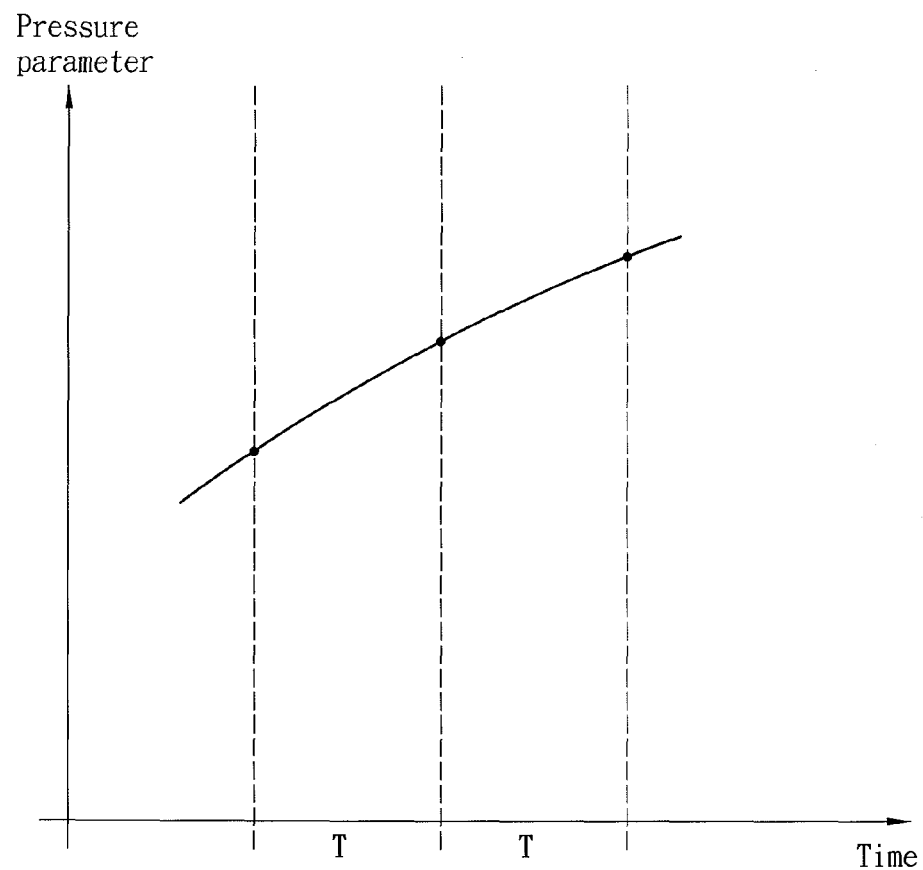
FIG. 9 is a schematic view of tire pressure variation in an embodiment of the invention.

In addition, step S30 further includes four conversion steps of S31, S32, S33 and S34. More specifically, step S31 converts the volume parameters in the inspection time to generate a volume gradient data. Step S32 converts the pressure parameters in the inspection time to generate a pressure gradient data. Step S33 converts the temperature parameters in the inspection time to generate a temperature gradient data. Step S34 converts the gas parameters in the inspection time to generate a gas gradient data. For instance, the pressure parameters at different time spots could have different values, hence form a changing curve with change of the time, as shown in FIG. 9. Furthermore, gradient variation amount at any given time period could also be different. In the event that the changing curve changes greatly due to variations of the gradient, it could mean that the tire 2 is in an abrupt hazardous condition.

A proportion judgment step S60 can also be added between step S30 and step S40 to judge whether the status gradient data coincide with the tire status variation calculation formula. More specifically, based on the tire status variation calculation formula it is known that p and T are in a direct proportion relationship, i.e., the tire pressure and the tire temperature of each tire 2 is in direct proportion with each other. Hence variation amounts of positive values and negative values of the pressure gradient data and the temperature gradient data of the tire 2 also are similar. When the pressure gradient data is positive the temperature gradient also is positive. It is to be noted that the direct proportion relationship between the tire pressure and the tire temperature of each tire 2 ought to be existed in a closed environment. In the event that variation amounts of p and T are different, namely p rises but T falls, and the pressure gradient data is positive but the temperature gradient data is negative, it means that the tire 2 is contradicting the basic prerequisite of the tire status variation calculation formula, then the tire 2 could be damaged and not in the closed environment. Hence, in the event that the status gradient data matches the tire status variation calculation formula, enter step S40. In the event that the status gradient data does not match the tire status variation calculation formula, enter step S50.

Furthermore, step S40 includes a first judgment step S41 and a second judgment step S42. First, the first judgment step S41 judges whether the status gradient data of one tire 2 and another tire 2 are coincided or proximate; if positive, redo execution of step S10; otherwise, enter the next step. For instance, one tire 2 could have a higher tire pressure due to loading, and the pressure measurement parameter measured by the tire detection unit 3 also increases. On the other hand, the tire pressure of the tire 2 could decrease due to release of the load, then the pressure measurement parameter measured by the tire detection unit 3 also decreases. In other words, by observing merely the tire measurement parameters and the tire calculation parameter of each tire 2, status variations of the tire 2 can be known easily. However, whether an abnormal condition has occurred to the tire 2 cannot be easily judged merely through the parameters. Hence the invention compares variations of the parameters of all the tires 2 through the electronic device 4, namely the status gradient data, to judge simply which one of the tires 2 has abnormal condition. In other words, in the event that there are four tires 2, if one of the tires 2 has variation amount of the pressure gradient data different from that of the other three tires 2, and fell rapidly, the one tire 2 could encounter rapid gas leakage that results in rapid falling of the tire pressure. Moreover, in the event that the electronic device 4 judges that the status gradient data of each tire 2 matches or is proximate that of the other tires 2, the method redoes execution of step S10 and continues the measurement and monitor processes.

Furthermore, the second judgment step S42 compares whether variation proportions of the pressure gradient data and the temperature gradient data of each tire 2 in the inspection time are proximate with each other. If negative, enter the next step. More specifically, through the calculation steps S22 and S23, the difference of values between the pressure parameter and the temperature parameter is merely in the tire volume parameter. Hence the difference of gradient variations of the pressure gradient data and the temperature gradient data also is not significant. Thus, through the method of the invention, by comparing variation proportions of the pressure gradient data and the temperature gradient data whether the tire 2 is safe or not can be known. Moreover, in the event that the electronic device 4 judges that the variation proportions of the pressure gradient data and the temperature gradient data are proximate, the method redoes execution of step S10 and continues the measurement and monitor processes.

Figure 4:
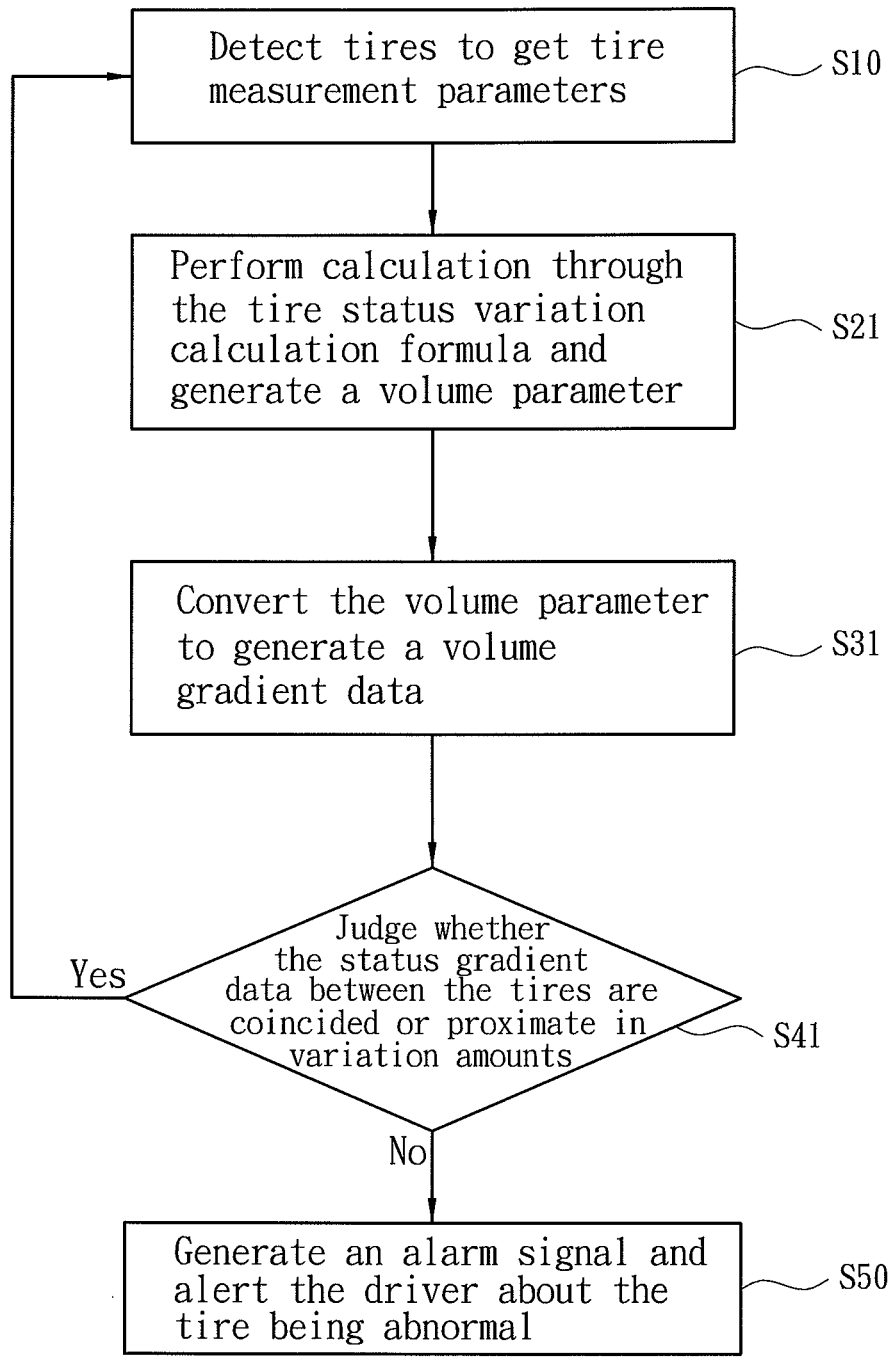
FIG. 4 is a process flowchart of a second embodiment of the invention.
Figure 5:
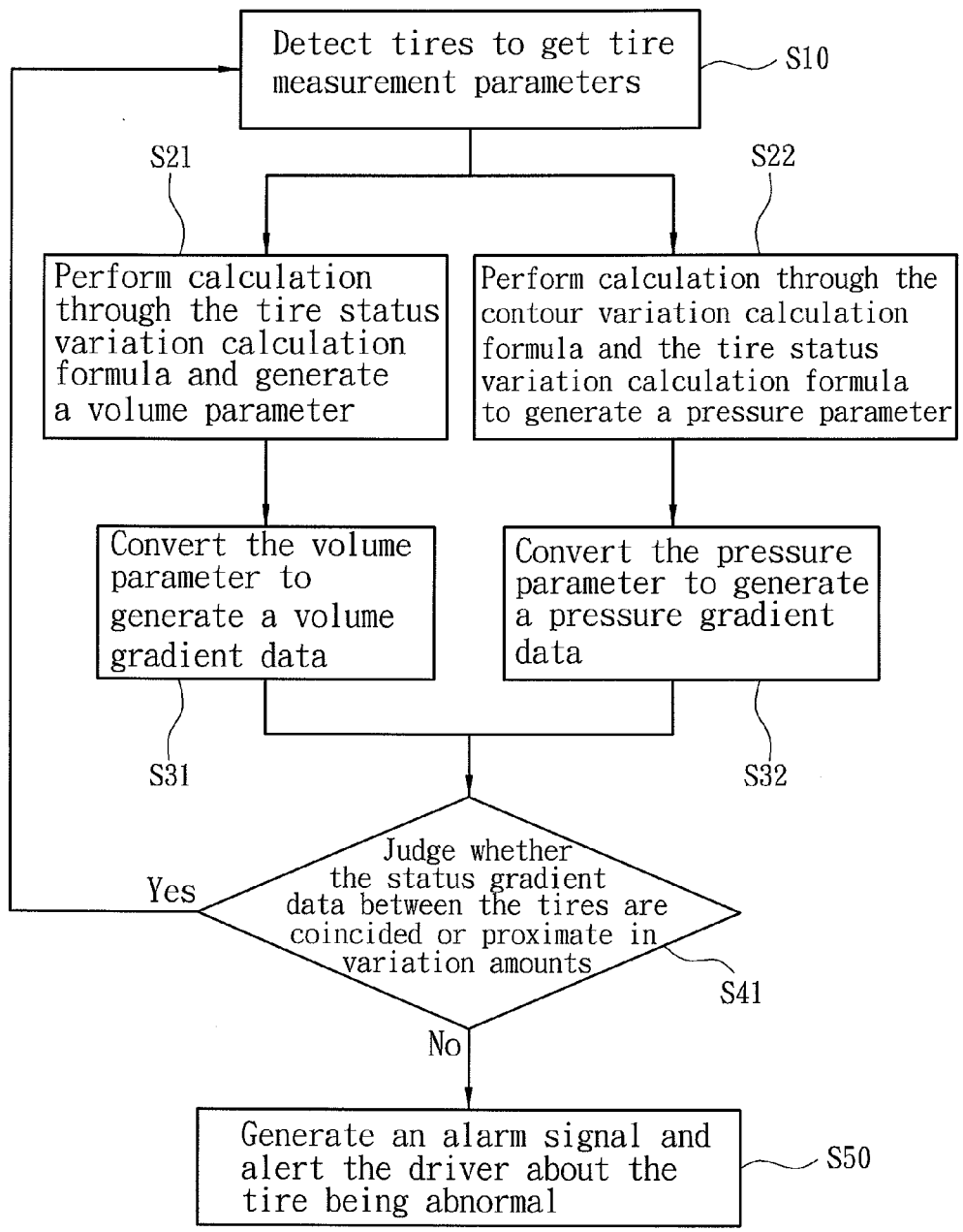
FIG. 5 is a process flowchart of a third embodiment of the invention.
Figure 6:
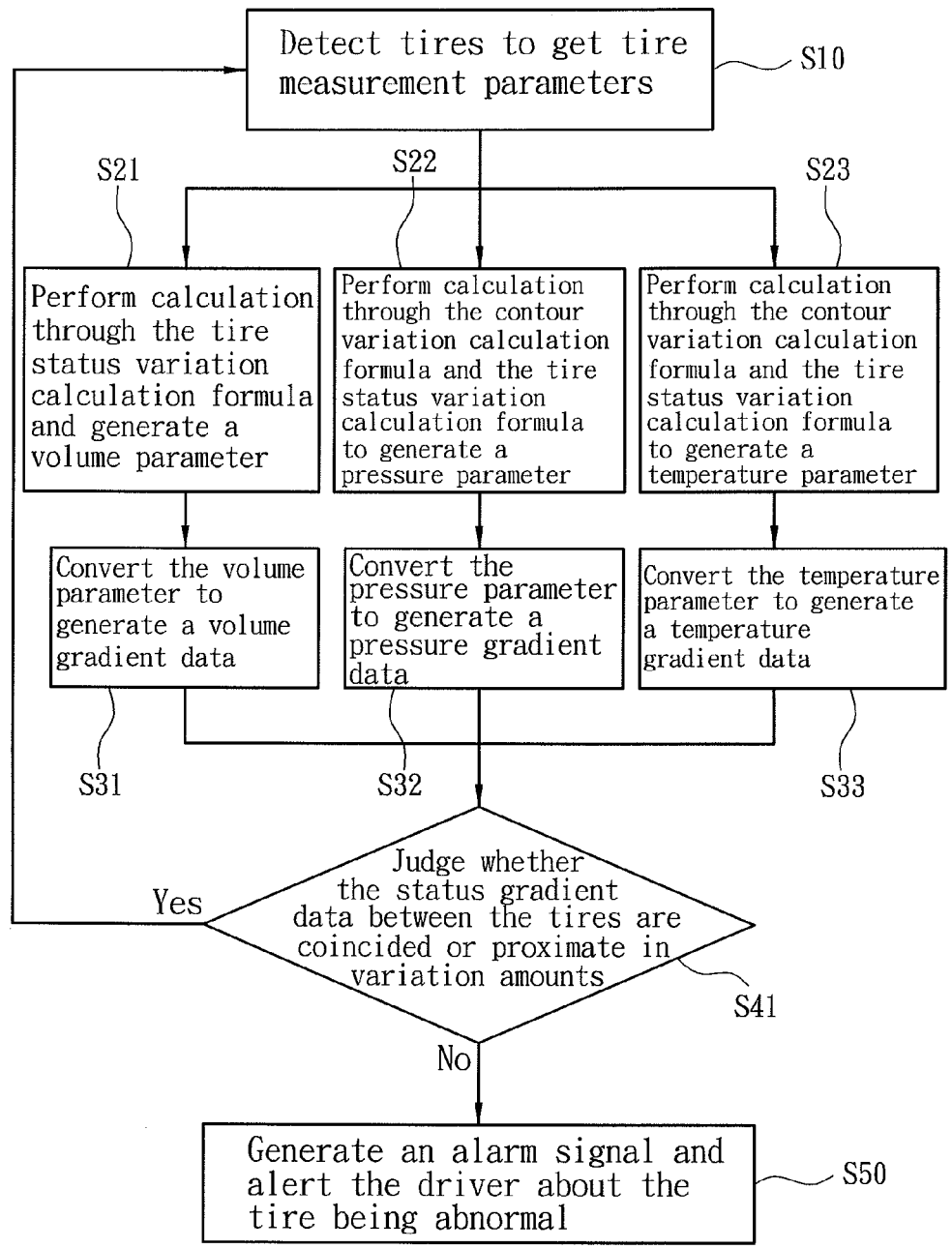
FIG. 6 is a process flowchart of a fourth embodiment of the invention.
Figure 7:
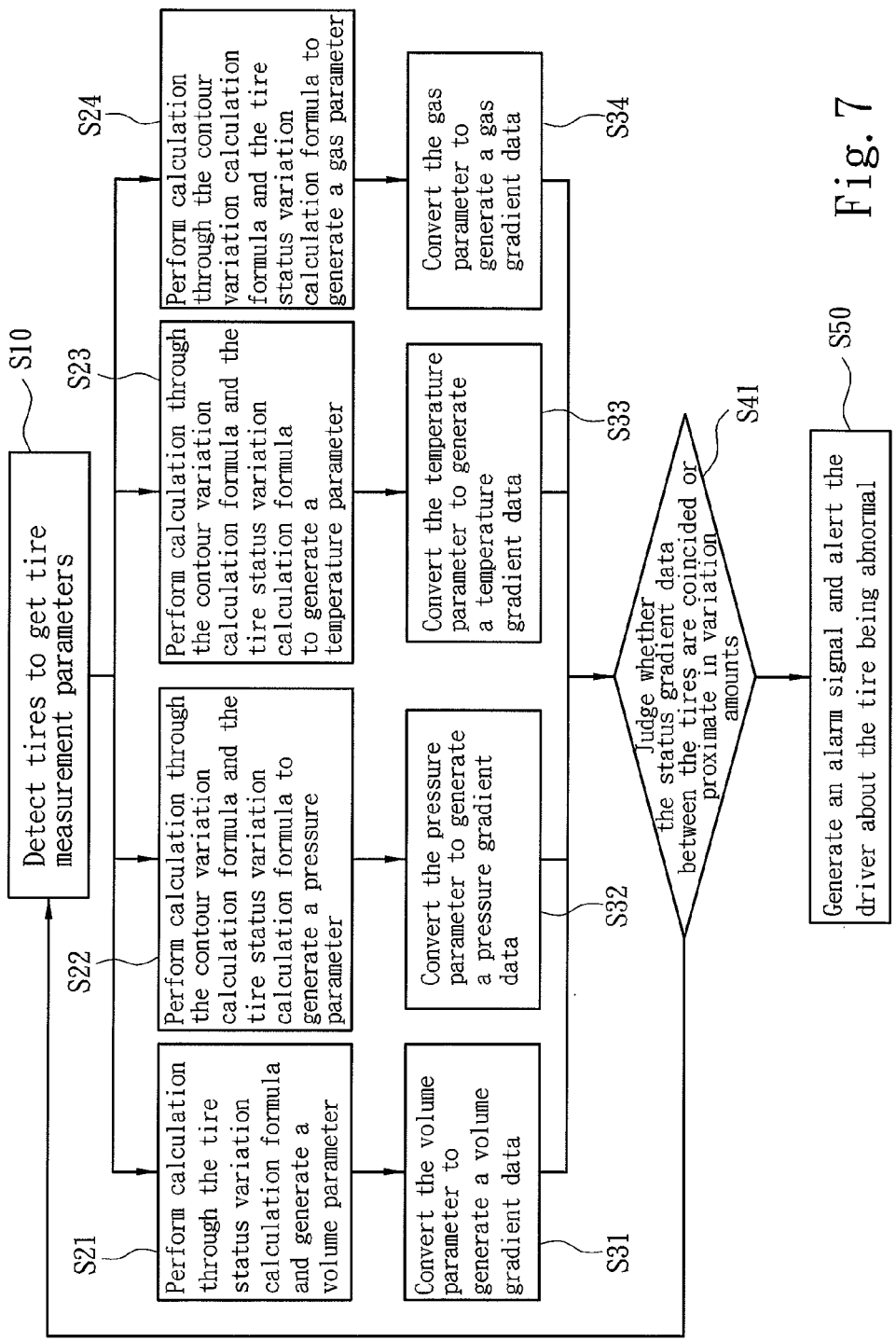
FIG. 7 is a process flowchart of a fifth embodiment of the invention.
Figure 8:
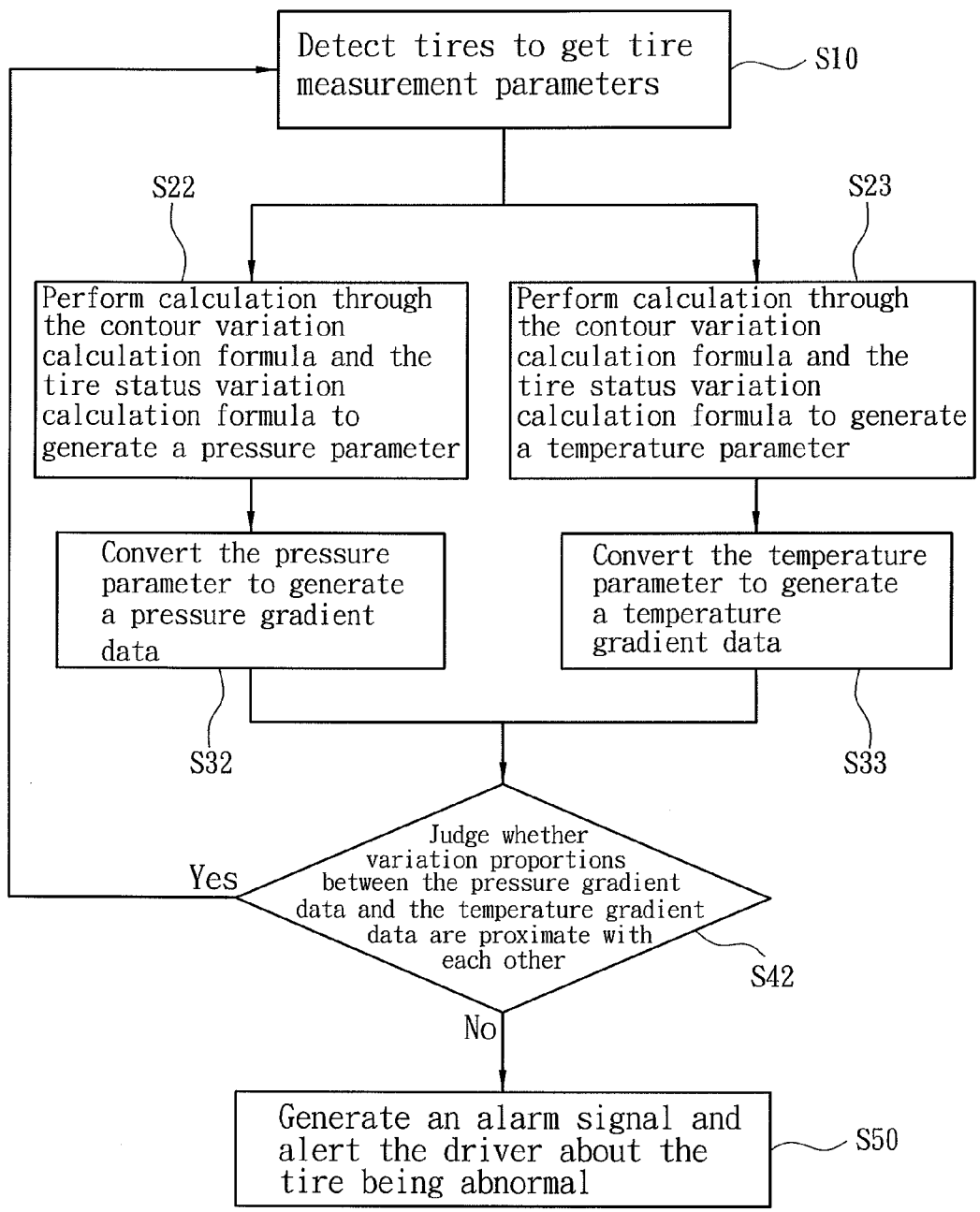
FIG. 8 is a process flowchart of a sixth embodiment of the invention.

It is to be noted that the invention is not limited to conversion of the volume gradient data, the pressure gradient data, the temperature gradient data and the gas gradient date respectively from the volume parameter, the pressure parameter, the temperature parameter and the gas parameter to perform monitoring. Monitoring can also be done by merely using one or more of the parameters and the gradient data previously discussed. However, using more parameters and gradient data can make monitoring of each tire 2 more accurate. Moreover, such a technique is novel and not seen in prior art. More specifically, please refer to FIG. 4 for the process flow of a second embodiment of the invention. It merely calculates the volume parameter and judges abnormal conditions through the volume gradient data. FIG. 5 illustrates the process flow of a third embodiment of the invention. It calculates the volume parameter and the pressure parameter, and judges the abnormal conditions through the volume gradient data and the pressure gradient data. FIG. 6 illustrates the process flow of a fourth embodiment of the invention. It calculates the volume parameter, the pressure parameter and the temperature parameter, and judges the abnormal conditions through the volume gradient data, the pressure gradient data and the temperature gradient data. FIG. 7 illustrates the process flow of a fifth embodiment of the invention. It calculates the volume parameter, the pressure parameter, the temperature parameter and the gas parameter, and judges the abnormal conditions through the volume gradient data, the pressure gradient data, the temperature gradient data and the gas gradient data. FIG. 8 illustrates the process flow of a sixth embodiment of the invention. It calculates the pressure parameter and the temperature parameter, and judges the abnormal conditions through the pressure gradient data and the temperature gradient data. In addition, the second embodiment through the sixth embodiment previously discussed further can include the proportion judgment step S60, and execute the first judgment step S41 and the second judgment step S42 after the proportion judgment step S60. The judgment mechanism is same as previously discussed, details are omitted herein.

Finally, at step S40 in the event that judgment of the volume gradient data, the pressure gradient data, the temperature gradient data and the gas gradient data has non-matching or non-proximate condition occurred, the main control unit 42 at step S50 displays which tire 2 is abnormal compared with other tires 2. In other embodiments the electronic device 4 can also alert the driver about the conditions of the tires 2 via sound, voice or flash light. More important, the driver can maintain the safety of the tires 2 in response to the tire conditions through measures such as removing the load or reducing the tire temperature or the like. In addition, in the event that the electronic device 4 displays that the temperature parameter rises continuously but the pressure parameter and the tire volume parameter remain unchanged, the tire 2 could encounter a slow gas leaking problem, hence the electronic device 4 can alert the driver.

In addition to the steps set forth above, the invention also can judge the conditions of the tires 2 through other approaches. More specifically, the tire design parameter further can include a maximum tire pressure which represents a sustainable tire pressure each tire 2 can bear. Hence by comparing the pressure parameter calculated and derived through step S20 with the maximum tire pressure safety of conditions of the tires 2 can be monitored.

What is claimed is:

1. A method for monitoring tire safety adopted for use on a vehicle which is equipped with a plurality of tires, a plurality of tire detection units located respectively on each tire to continuously detect interior conditions of the corresponding tire, and an electronic device which forms an information link with each tire detection unit; each tire including a tire design parameter to represent composition of the tire and a gas filling parameter to indicate a gas filled in each tire, the method comprising the steps of:

step 1: measuring a tire measurement parameter through each tire detection unit corresponding to each tire;

step 2: performing calculation of the gas filling parameter and the tire measurement parameter of each tire through a tire status variation calculation formula to generate a tire calculation parameter to represent interior conditions variation of the tire;

step 3: calculating variation amount of the tire calculation parameter in an inspection time and converting to a status gradient data;

step 4: judging whether the status gradient data of each tire is consistent or whether the variation amount of the status gradient data of the same tire is close; if yes, redoing execution of step 1, otherwise entering the next step; and step 5: generating an alarm signal through the electronic device and alerting the driver of the vehicle at least one of the tires being abnormal.

2. The method of claim 1, wherein the tire design parameter includes a linear thermal expansion coefficient and a circumferential length of the tire after inflation, the gas filling parameter including a mole number of gas molecules and a gas constant.

3. The method of claim 1, wherein the tire measurement parameter includes a temperature measurement parameter obtained from a tire temperature of the tire and a pressure measurement parameter obtained from a tire pressure of the tire, the tire calculation parameter including a volume parameter which represents the volume of the tire at one time, the status gradient data including a volume gradient data generated via conversion of a plurality of the volume parameters in the inspection time.

4. The method of claim 1, wherein the tire status variation calculation formula is:

$$p \cdot V = n \cdot R \cdot T$$

where p is the tire pressure of each tire, V is the volume of each tire, n is the number of moles of gas molecules of each tire, R is a gas constant of each tire, and T is a tire temperature of each tire.

5. The method of claim 1, wherein step 2 further includes performing calculation of the tire design parameter and the tire measurement parameter of each tire through a contour variation calculation formula to generate a tire volume parameter to represent variation of each tire, the contour variation calculation formula being:

$$(L_T - L_0) = \alpha \cdot L_0 \cdot \Delta T$$

where LT is a final circumferential length of each tire changed with tire temperature, L0 is an initial circumferential length of each tire, $\alpha$ is a linear thermal expansion coefficient of each tire, and $\Delta T$ is a variation amount of the tire measurement parameter of each tire which has a temperature measurement parameter obtained from a tire temperature of the tire.

6. The method of claim 5, wherein step 2 further includes performing calculation of the gas filling parameter, the tire volume parameter and the tire measurement parameter which includes a temperature measurement parameter obtained from the tire temperature through the tire status variation calculation formula to generate the tire calculation parameter which includes a pressure parameter to represent the tire pressure of the tire at one time, the status gradient data including a pressure gradient data generated via conversion of the multiple pressure parameters in the inspection time.

7. The method of claim 6, wherein step 2 further includes performing calculation of the gas filling parameter, the tire volume parameter and the tire measurement parameter which includes a pressure measurement parameter obtained from the tire pressure through the tire status variation calculation formula to generate the tire calculation parameter which includes a temperature parameter to represent the temperature of the tire at one time, the status gradient data including a temperature gradient data generated via conversion of the multiple temperature parameters in the inspection time.

8. The method of claim 7, wherein step 4 further includes comparing in the inspection time whether gradient variation ratio of the pressure gradient data and the temperature gradient data are close, if yes, redoing execution of step 1, otherwise entering the next step.

9. The method of claim 5, wherein step 2 further includes performing calculation of the tire volume parameter and the temperature measurement parameter obtained from the tire temperature and the tire measurement parameter which includes a pressure measurement parameter obtained from a tire pressure of each tire through the tire status variation calculation formula to generate the tire calculation parameter to represent the gas parameter of the tire that changes at one time, the status gradient data including a gas gradient data generated via conversion of the multiple gas parameters in the inspection time.

10. The method of claim 1, wherein step 4 further includes judging whether the status gradient data of one tire and other tires coincide or proximate in variation amounts, if yes, redoing execution of step 1, otherwise continuing to the next step.

11. The method of claim 1, wherein before step 4, the method further comprises judging whether the tire status variation calculation formula is satisfied by substituting the status gradient data in the inspection time, if yes, redoing execution of step 4, otherwise entering step 5.

* * * * *